March 25, 1952  D. W. EPSTEIN  2,590,240
MULTIPLE IMAGE PROJECTOR
Filed July 31, 1948
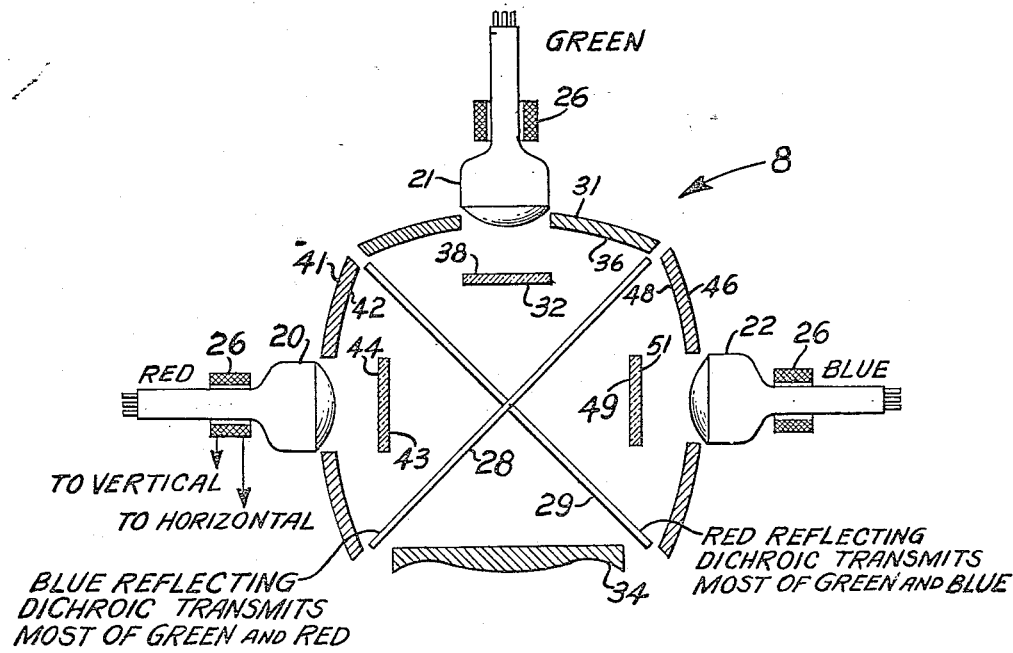
INVENTOR
DAVID W. EPSTEIN
ATTORNEY Patented Mar. 25, 1952

2,590,240

UNITED STATES PATENT OFFICE 2,590,240

MULTIPLE IMAGE PROJECTOR

David William Epstein, Princeton, N. J., assignor to Radio Corporation of America, a corporation of Delaware Application July 31, 1948, Serial No. 41,851

6 Claims. (Cl. 178—5.4)

The present invention relates to systems for projecting multiple images in accurate register produced by the image recreating device or devices of a television receiver or the like, and more particularly, although not necessarily exclusively, to an improved multiple projector employing reflective optics which is compact and in which a novel arrangement is provided for obtaining color separation images for projection in accurate register.

In accordance with the invention, a plurality of image producing devices are compactly arranged with respect to a like number of reflective optical systems. Each optical system is optically similar to that disclosed in U. S. Patent No. 2,295,779 granted September 15, 1942. Also in accordance with the invention, a dichroic mirror system is combined in a novel manner with the interrelated elements of the several optical systems and therefore a single correcting lens serves, in accordance with the invention, as a common element in the several optical systems. In the ilustrative example, three image producing cathode ray tubes are provided from which luminous patterns or images are projected in accurate register on a viewing surface such, for example, as a viewing screen. The latter may be of the reflective type, or it may be of the translucent type. Projection from each tube may occur simultaneously or successively in any order.

An important aim or object of the present invention is to provide for the accurate superposition of a plurality of reflectively projected images on a viewing surface, such as the exposed surface of an opaque or translucent viewing screen.

Another closely related object is to provide for registration of the image by arranging the reflective optical systems to have their optical axes coincide along the final light path to the viewing surface.

In accordance with a novel feature of the invention, the reflective projectors have a common optical element through which image forming light passes on its way to the viewing surface.

A further object resides in the provision of a novel image projector having a plurality of separate image producing devices.

Still another object is to provide a novel projector incorporating a plurality of image producing devices each associated with a bireflective optical system for imaging the light pattern of said image producing devices on the exposed surface of a viewing screen.

Still another object is to provide a novel multiple image projector incorporating three cathode ray tubes, each tube being associated with a bireflective optical system, the three optical systems being coupled with a dichroic filter system.

Other objects and advantages of the invention will, of course, become apparent and immediately suggest themselves to those skilled in the art to which the invention is directed from a reading of this specification in connection with the accompanying drawing, the signal figure of which is a partially sectioned view in elevation of a projector embodying the invention which is capable of projecting a plurality of color separation images for superposition in accurate register on the viewing surface of a viewing screen or other surface.

Referring to the single figure of the drawing, which shows the general organization of a television projection system 8, embodying the invention in an illustrative form, the system is seen to comprise three optical systems or paths for projecting an image toward a viewing screen, for example, the screen 13 is indicated in the figure. The final optical axes of these optical paths, by reason of the teachings of this invention, coincide to provide a single registered image to be viewed. Each optical system or optical path receives light from its respective image producing device such as a cathode ray tube. Three such tubes are provided in the illustrative example designated 20, 21 and 22. It is to be understood that a suitable support (not shown) is provided for the projection system 8 and the tubes 20, 21 and 22 so that the projected images may be aimed at the viewing screen 13. The latter may be of the ordinary reflecting type or it may be translucent. The previously mentioned support for the structure 14 may be of the portable type and may, if desired, include apparatus suitable for operating the cathode ray tubes 20 to 22.

All of the tubes 20 to 22 may operate continuously and simultaneously at any selected field or frame repetition rate so that the combined viewed image is the result of the simultaneous operation of all of the tubes. On the other hand, without departing from the intent of the invention, the various tubes 20 to 22 may operate in sequence so as to produce the observable final color or other images or patterns in a sequential manner, as is customary with the so called sequential type of color television system. In this latter form of operation a suitable operational cycle for the tube is usually established so that while each tube produces a field of the composite polychrome or multi-color image in one selected color, for instance, it will, in the double interlace system, alternately produce in its successive operational periods the line traces representing first the even lines and then the odd lines, and so on. It will be understood that the choice of component colors in which the images are to be recreated and the exposure sequence of the selected colors will depend entirely upon the color system for which the projector is used. Since the mode of operation and details of such color systems as the above mentioned simultaneous and sequential types are not a part of the present invention, they are not illustrated nor will they be further described. Technically in a polychrome television system it is largely immaterial as to what type of luminescent compounds are used to coat the screen or target areas of the several cathode ray image producing tubes 20 to 22. Good quality color can be had where all tubes use a luminescent compound to create the several component color images in black and white monochrome inasmuch as the inventive disclosed herein includes appropriate component color filters. In many instances, however, the tubes may have the screen or target area coated with luminescent compounds which tend to produce light of the selected component color so that the color filter system to be described hereinafter, receives aid from the image light source, in this instance the cathode ray tubes, in performing their separating function. Also, certain elements of the optical systems may be selectively reflective to aid in color selection.

To refer to one suitable and illustrative form of arrangement which has been found satisfactory in operation, and which is represented by the illustrative arrangement shown by way of example, the tube 21 will be assumed to operate under control of green image signals. The tube 20 will be assumed to operate under control of red image signals. The tube 22 will be assumed to operate under control of blue image signals.

Each of the tubes 20 to 22 is provided with a deflecting yoke 26 (shown conventionally) for producing deflection of the cathode ray beam in a well known manner. The external connections for the yoke 26 for the tube 20 are indicated diagrammatically and by legends on the drawing. Suitable yokes may be constructed as described in United States Patent No. 2,428,947, granted to C. E. Torsch on October 14 1947.

While employment of the multiple projector of this invention for projecting color images to form a colored television image has been discussed in the foregoing, it will be understood the tubes 20 to 22 may each produce and project the same image in substantially the same color to give a monochrome image upon a screen so that greater light intensity of the projected image is obtained. The suggested television uses of the invention herein described are in nowise to be construed as restrictive of a more general use of the invention.

The optical systems for the three projectors will now be described. Each system or optical light path, considered separately, is, in general of the bireflective type disclosed in United States Patent No. 2,295,799 previously referred to. The overall operation of the multiple projector disclosed herein as well as the optical systems associated with the tubes 20 and 22 are modified by dichroic mirrors 28 and 29 to be described hereinafter. Suitable dichroic devices are known to those skilled in the art. Attention is directed at an appropriate point hereinafter to descriptions of dichroic reflectors.

The reflective optical system for the tube 21 comprises a spherical mirror 31, a plane mirror 32 and an aspheric zone plate 34 (also termed "correcting plate" or "correcting lens"). The spherical mirror 31 is provided with a spherical reflecting surface 36 and the plane mirror 32 is provided with a reflecting surface 38 which faces the luminescent target of the tube 21.

The tube 20 is associated with the optical system comprising a spherical mirror 41 having a spherical reflective surface 42, and a plane mirror 43 having a reflecting surface 44. The aspheric zone 34 is also a part of the reflective optical system associated with the tube 20.

Associated with the tube 22 is an optical system comprising the spherical mirror 46 having spherical reflecting surface 48 and a plane mirror 49 having a plane reflecting surface 51. The spherical zone plate 34 is again common to the system for the tube 22 as well as for the systems for the tubes 20 and 21.

For example, the dichroic mirror 28 is provided with a coating which is reflective to blue and transparent to red and green, and dichroic mirror 29 on the other hand, is coated with a material reflective to red and transmissive to blue and green. The legends on the drawing indicate the nature of the selective transmission and reflection.

In the illustrative example when the tube 22 operates under control of signals to produce light corresponding to blue portions of an original image it can be seen that blue light from the tube 22 will reach the screen 13 inasmuch as the mirror 28 reflects the blue light and transmits most of the red and green light. It will also be noted that the optical axis of the bireflective system associated with the tube 22 is turned through 90 degrees to pass through the correcting plate 34. The optical system for the tube 20 serves in a similar manner so that red light representing red portions of the image reaches the screen 13. The optical axis of the bireflective system for the tube 20 is also turned through 90 degrees before the correcting plate 34 is reached. When the tube 21 operates under control of signals representing green portions of the original image and is producing light in these portions, substantially only the green light from the tube 21 will reach the screen 13. Selective reflective and transmision of the dichroic system permits this.

As stated above, the tube 20 may be provided with a luminescent material which produces red light or predominantly red light upon excitation. The tube 21 may be provided with a luminescent compound which is green or predominantly green upon excitation. The tube 22 may be provided with a luminescent compound which is blue or predominantly blue upon excitation. Color filters may also be employed in conjunction with the tube faces if desired. For example, the face of the tube 20 will be provided with a red filter and the remaining tubes with appropriate filters. The possible arrangements just discussed will assist in obtaining better color images.

The plane reflecting surfaces 38, 44 and 51 of the plane mirrors 32, 43 and 49, respectively, may be made selectively reflective so as to favor reflection of the color desired to be reflected from each and ultimately projected on the screen 13. For example, the surface 38 may be green reflective, the surface 44 may be red reflective and the surface 51 may be blue reflective. The choice of surfaces for the plane mirrors just set forth by way of example may be made in conjunction with appropriate luminescent materials thus further enhancing the over-all color effect of the image projected on the screen 13.

The details of the surface coating of the mirrors 28 and 29 do not directly form a part of this invention, but for the sake of completeness of description, reference is made to previous art, including the article by G. L. Dimmick entitled "A new dichroic reflector and its application to photocell monitoring systems," beginning on page 36 of the "Journal of the Society of Motion Picture Engineers" for January 1942 and referred to above, and the following U. S. patents issued to G. L. Dimmick:

| Patent No. | Date |
| --- | --- |
| 2,352,085 | June 20, 1944. |
| 2,360,403 | October 17, 1944. |
| 2,371,611 | March 20, 1945. |
| 2,379,790 | July 3, 1945. |
| 2,392,978 | January 15, 1946 |
| 2,399,860 | May 7, 1946. |
| 2,408,604 | October 1, 1946. |

Having now described the invention, what is claimed and desired to be secured by the Letters Patent is the following:

1. A projector for superposing a plurality of projected images in substantially accurate register to be viewed as a single image by an observer comprising a plurality of reflective projector systems, each system having a mirror, the reflecting surface of which is a surface of revolution and a plane mirror, the optical axes of all of said systems each having a portion extending in the direction of the superposed image which coincides, and each system having associated therewith a luminous image source and deflectable means for producing a bidimensional luminous image.

2. A projector for directing a plurality of projected images in substantially accurate register to be viewed as a single image by an observer comprising a plurality of projector systems, each system comprising a luminous image producing device, a plane mirror and a spherical mirror, the optical axes of all of said systems each having a portion which coincides, and an aspheric zone plate on the coinciding axes and being common to the projector systems.

3. A projector for directing a plurality of projected images in substantially accurate register to be viewed as a single image by an observer comprising a plurality of projector systems, each system comprising a luminous image producing device, a plane mirror and a spherical mirror, a dichroic reflector system comprising a plurality of dichroic reflectors, and a single aspheric zone plate receiving light from said luminous image sources by way of the plurality of optical systems and the dichroic reflectors.

4. A projector for projecting a plurality of images so that each image will occupy very nearly the same position on a viewing surface comprising a plurality of reflective optical systems, one of said systems having a continuous optical axis, the remaining optical systems having a portion of each of their optical axes arranged in a single plane and having another portion which is common to the optical axis of said system having the continuous optical axis.

5. A projector for projecting optical images in register upon a single viewing surface comprising three separate optical systems, a light producing device associated with each system, each system comprising a spherical mirror and a plane mirror facing its respective image producing device, a single aspheric zone plate common to all said optical systems, a pair of intersecting elements each having selective color transmission and reflective characteristics and each positioned to extend on both sides of the other, said pair of intersecting elements being located so that their axis of intersection coincides with the point of intersection of the optical axes of the three optical systems.

6. A projector for projecting optical images in register upon a single viewing surface comprising three separate optical systems, a cathode ray tube associated with each system, each system comprising a spherical mirror and a plane mirror facing its respective cathode ray tube, a single aspheric zone plate common to all said optical systems, a pair of intersecting dichroic elements each having selective color transmission and reflective characteristics and each positioned to extend on both sides of the other, said pair of dichroic elements being located so that their axis of intersection coincides with the point of intersection of the optical axes of the three optical systems, said pair of dichroic elements having the exposed surfaces thereof located at 45 degrees with respect to any of the optical axes of said projection systems.

DAVID WILLIAM EPSTEIN.

REFERENCES CITED

The following references are of record in the file of this patent:

UNITED STATES PATENTS

| Number | Name | Date |
| --- | --- | --- |
| 1,857,578 | Wright | May 10, 1932 |
| 2,273,801 | Landis | Feb. 17, 1942 |
| 2,295,779 | Epstein | Sept. 15, 1942 |
| 2,335,180 | Goldsmith | Nov. 23, 1943 |
| 2,352,777 | Douden | July 4, 1944 |
| 2,373,936 | Wright | Apr. 17, 1945 |
| 2,454,144 | Epstein | Nov. 16, 1948 |